Jan. 31, 1967  K. W. MUELLER  3,301,201
FURNACE
Filed Sept. 29, 1964  2 Sheets-Sheet 2

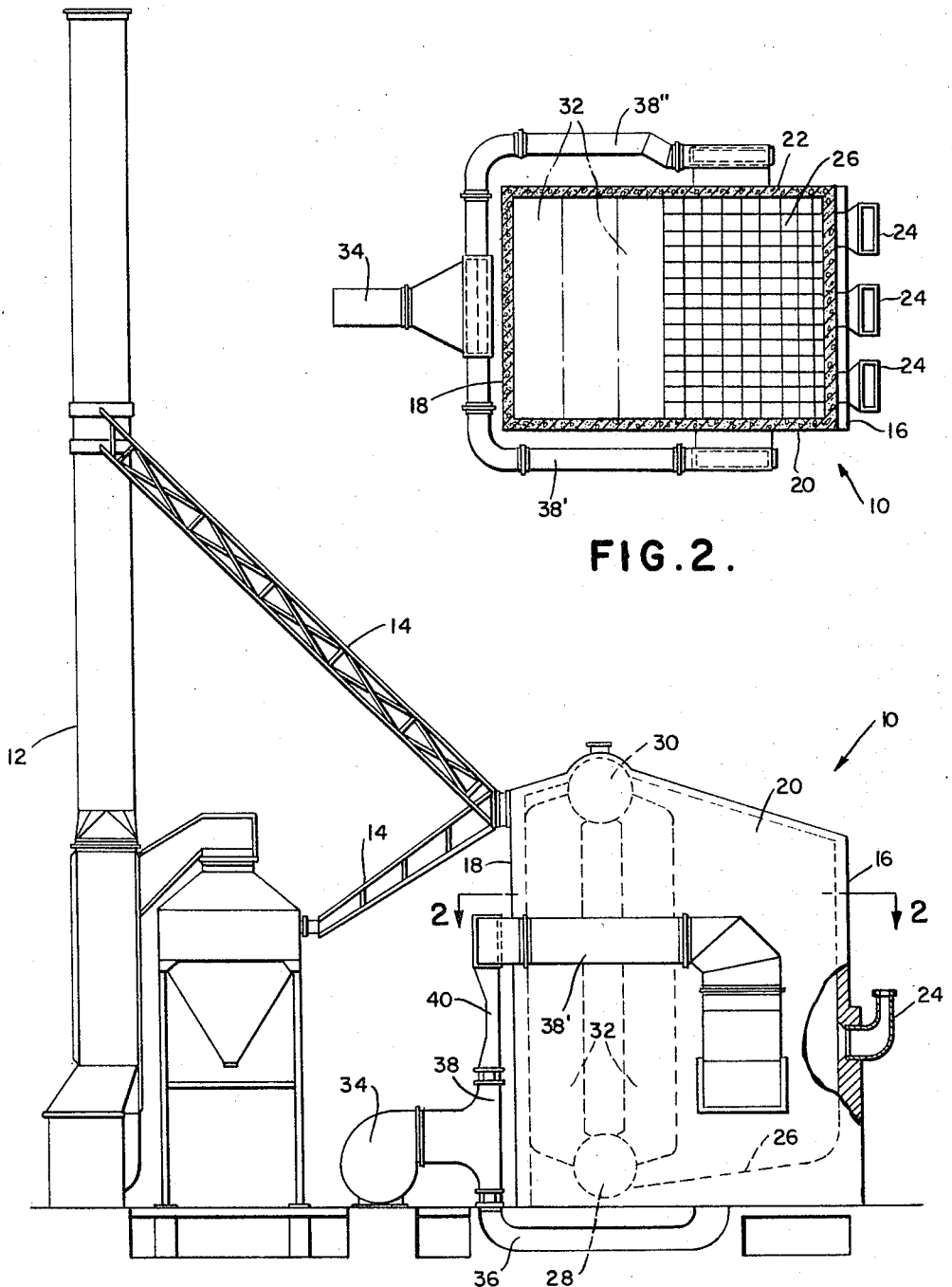

INVENTOR
Klaus W. Mueller

BY Karl W. Flocks

ATTORNEY

United States Patent Office

3,301,201
Patented Jan. 31, 1967

3,301,201
FURNACE
Klaus W. Mueller, Yonkers, N.Y., assignor to Diamond International Corporation, a corporation of Delaware
Filed Sept. 29, 1964, Ser. No. 400,106
6 Claims. (Cl. 110—10)

The present invention relates to a furnace and, more particularly, to a furnace for burning wet waste fuel to provide heat for a boiler.

Heretofore in the burning of wet waste fuel, excess moisture has generally been removed before the fuel has entered the furnace. This entails an uneconomical moisture removal stage and, consequently, additional equipment. Many other systems also have been devised which eliminate the initial moisture removal operation, but these generally result in occasional "slugging" or the blanketing of the fire on the grate with a layer of wet fuel, thereby stopping combustion.

Previous furnaces, designed to burn wet sawmill waste or similar fuel of an average moisture content below 45%, have been found to be inoperative when the moisture content of the fuel exceeds 60%. (For fuels of different heat values, the percentage of moisture that can be tolerated will vary somewhat.)

Although the intrinsic heat value of the fuel remains unchanged by the moisture content, the available heat output per unit of fuel decreases as the moisture content increases since part of the heat is used to evaporate the moisture. Because of the added evaporation load, less heat is available while the evaporative cooling effect acts to lower the flame temperature. Thus, when the flame temperature falls below the ignition temperature of the fuel, combustion ceases. The devices of the prior art have failed to successfully maintain a sufficiently high furnace temperature to sustain combustion when a wetter fuel is used than can be tolerated by the ignition temperature requirements of the fuel for the particular furnace design, i.e. the prior art furnaces are inflexible and unable to accommodate large increases in moisture content of fuel. Even such prior art furnaces as contain secondary fuel burners do not provide sufficient control to permit the large variation of wet primary fuels having different moisture contents.

In conventional furnaces, the controlling factor in providing sufficient oxygen for the fuel burned is the maximum fuel capacity of the furnace. Fans are provided which have adequate capacity to meet this maximum burner output. For partial burner load, combustion air is proportioned accordingly. Such a control scheme is completely unsuitable for furnaces using simultaneously two distinct fuels of different composition because a given amount of oxygen to satisfy the maximum furnace demand for one type of fuel will be different than that required for another type of fuel to obtain the same heat output; i.e. to satisfy the maximum furnace demand for gas fuel to provide a given amount of heat will require less combustion air than to satisfy the maximum furnace demand for wood fuel to provide the same amount of heat. Where the same type of control scheme is attempted in two-fuel furnaces, a change in fuel composition must be compensated for by a change in fuel/air ratio, since combustion air input is set as a fixed ratio of fuel input. For these reasons it is clear that conventional control schemes are inadequate to meet mixed and variable fuel conditions.

It is therefore an object of the present invention to provide a system for overcoming the disadvantages of the prior art, such as those indicated above.

It is another object of the present invention to provide an apparatus for burning wet primary fuel by the addition of a metered amount of a secondary fuel in order to evaporate moisture from the primary fuel in the furnace as required and to maintain combustion.

It is another object of the present invention to provide a furnace apparatus for effectively and inexpensively providing heat for a boiler.

It is another object of the present invention to provide a controlled addition of a secondary (fossil) fuel, e.g. natural gas, oil, and the like, when required to compensate for the excess moisture in the primary fuel to the extent necessary to maintain a furnace temperature sufficiently above the ignition temperature of the primary fuel to insure uninterrupted and complete combustion.

It is another object of the present invention to provide an apparatus for drying wet fuel while it is suspended in the furnace.

It is another object of the present invention to provide a control system for a two-fuel furnace for apportioning combustion air for the secondary fuel after the demand of the primary fuel has been met; for limiting secondary fuel flow to the furnace to the amount of combustion air available beyond the requirements of the primary fuel; and for limiting secondary fuel flow to the maximum furnace capacity for combined burning of both fuels.

These and other objects and the nature and advantages of the instant invention will be apparent from the following description taken in conjunction with the accompanying drawings, wherein:

FIG. 1 is a side elevation showing a general overall arrangement and a duct assembly of a device in accordance with the present invention;

FIG. 2 is a section taken along line 2—2 of FIG. 1;

Figure 3:
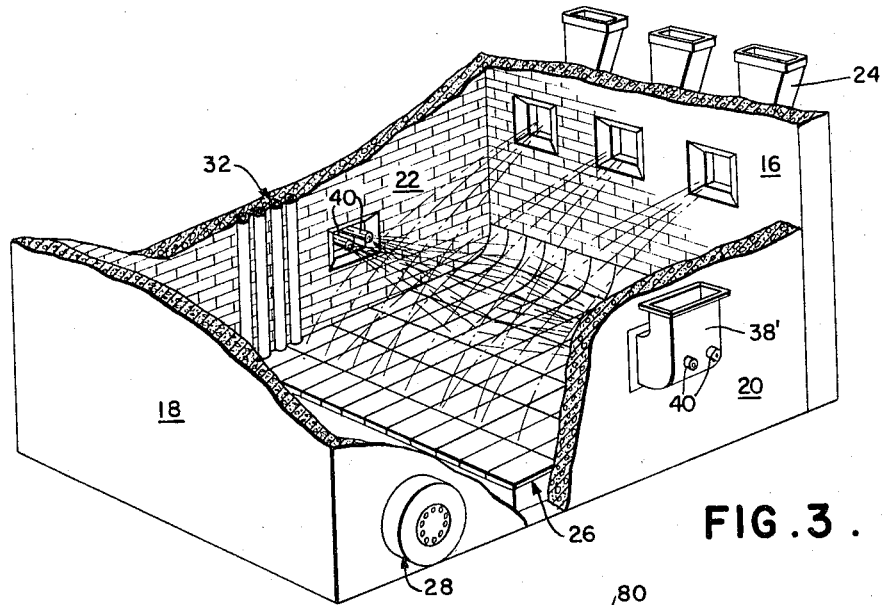
FIG. 3 is a schematic perspective partly in section of a furnace-boiler of the device of FIG. 1.

The invention broadly consists of the addition of secondary burners, which use a suitable secondary fuel (e.g. fossil fuel such as natural gas, oil, etc.), to a furnace, such as a spreader-stoker type, for a wet primary fuel (e.g. hogged wood waste, bark, bagasse, sewage, garbage, etc.). The furnace will generally be of the type which is used to provide heat to a boiler. An important feature is the principle of applying and controlling the introduction of the secondary fuel at a point in the furnace where the primary fuel traverses the path of the flame of the burning secondary fuel and is sufficiently exposed to the flame while suspended in the furnace, thus effecting sufficient drying of the primary fuel so that it will ignite. The position of the secondary fuel burner(s) relative to the grate and to the primary fuel feeders should be such that, in addition to intercepting the descending primary fuel particles, the flame of the secondary fuel burners will radiate heat to the grate and thereby aid the combustion of primary fuel at rest on the grate.

Another important feature is the proportioning of the secondary fuel feed so that at any given time there will be sufficient secondary fuel to maintain combustion in the furnace, this being dependent on the quantity of primary fuel fed to the furnace and the amount of moisture which must be evaporated from that particular primary fuel to maintain its combustion. The variable introduction of secondary fuel will also be dependent upon steam demand surges from the boiler, since these demands are generally too rapid to be satisfied by increasing the feed rate of wet primary fuel; in addition and as a fourth factor in determining the rate of introduction of a secondary fuel, the rate will be dependent upon the amount of excess oxygen available for combustion of the secondary fuel after satisfying the oxygen demand for the primary fuel combustion. This fourth factor will be an upper limit and an excess of oxygen containing air will generally be fed to the furnace to account for any foreseen needs. In addition, to avoid overloading the furnace, the feed rate of the primary fuel is generally limited to an amount that can be burned in the furnace under maximum moisture conditions with the necessary addition of secondary fuel by the total available combustion air.

The preferred embodiment comprises a pneumatic spreader-stoker fired boiler wherein the furnace contains, not only the spreader-stoker for wet primary fuel, such as sawdust, hogged waste wood and bark, but also burners for secondary fuel, such as gas. The gas burners are located where their flame will impinge on the descending wet wood particles as they are blown into the furnace. The wet fuel particles must then cross the burner flame and the ascending hot combustion gasses. Thus a portion of the moisture is evaporated while the primary fuel is suspended in the hot combustion gasses and the upward flow of such gasses delays the descent of the primary fuel to the furnace grate thereby increasing the time available for evaporation of moisture while the primary fuel is suspended in the furnace. The smaller primary fuel particles will ignite while still in suspension while the larger lumps will be sufficiently dry by the time they land on the burning fuel pile on the grate to ignite and burn.

The primary measuring element which controls fuel input to the furnace is based on boiler steam pressure (where pressure increase denotes heat input demand decrease and vice versa). The furnace is preferably base-loaded on a given wet fuel input rate, depending on moisture content and anticipated steam demand. Secondary fuel is then added to compensate for excess primary fuel moisture and, beyond that, to take rapid steam load fluctuations (load swings), since gas burners react rapidly to load changes while spreader stokers are sluggish.

FIG. 1 shows a plan view of a device in accordance with the present invention. A furnace-boiler 10 is provided having adjacent thereto a suitable chimney 12 connected thereto by a suitable draft conduit and supported by structural elements 14. The furnace-boiler 10 is constructed of suitable heat resistant material, such as fire brick which is well known in the art, and has two end walls 16 and 18 and two side walls 20 and 22.

Within the end wall 16 are provided a plurality of primary fuel distributing hoppers 24. These hoppers 24 are preferably fed by pneumatic fuel distributors which supply a primary wet fuel such as wet saw dust or wood chips. The hopper 24 opens into the interior of the furnace-boiler 10 through the wall 16 at a point relatively high on the wall 16.

As is well known, the furnace-boiler 10 is provided with a suitable grate 26 along its bottom surface thereof. The grate 26 is preferably water cooled. Between the grate 26 and the wall 18 is provided a conventional lower drum 28 of the boiler portion of the furnace-boiler 10. At the extreme upper point of the furnace-boiler 10 is provided the main or upper steam drum 30 which is spaced more or less directly above the lower drum 28. Banks of typical water wall tubes 32 pass between the lower drum 28 and the upper drum 30.

A forced draft fan 34 is provided outside the furnace-boiler 10 and adjacent the wall 18. The fan 34 is provided with a first conduit 36 which passes underneath the furnace-boiler 10 to an area immediately beneath the grate 26. The first conduit 36 provides an under-grate forced draft for the furnace.

A second conduit 38 having a Venturi section 40 also extends from the forced draft fan 34. The second conduit 38 above the Venturi branches into two lines 38' and 38" both of which extend through the side walls 20 and 22, respectively, to open into the interior of the furnace at a point lower in height on the side walls than the point at which the hoppers 24 open into the furnace. Combustion air is thereby forced from the fan 34 into the furnace at a point intermediate in height between the grate 26 and the wet primary fuel distributors 24.

A plurality of secondary fuel nozzles 40 extend through the combustion air lines 38' and 38" to feed secondary fuel into the furnace at the same level and position with the combustion air. As shown schematically in FIG. 3, the wet fuel is fed from the distributors 24 into the interior of the furnace where it falls or is projected towards the grate 26. Because of the heat in the furnace, the secondary fuel will be ignited immediately upon ejection from the nozzles 40 and the wet primary fuel will thereby pass through the flame of the secondary fuel.

In operation, the secondary fuel is preferably either gas or oil, since these fuels provide the greatest degree of flexibility. The heat provided by combustion of the secondary fuel will be sufficient so that the small pieces of wet primary fuel will be completely ignited before they reach the grate 26, while the larger pieces will be completely dried prior to hitting the grate 26 where they will then be ignited with the aid of combustion air passing through the first conduit 36.

Figure 4:
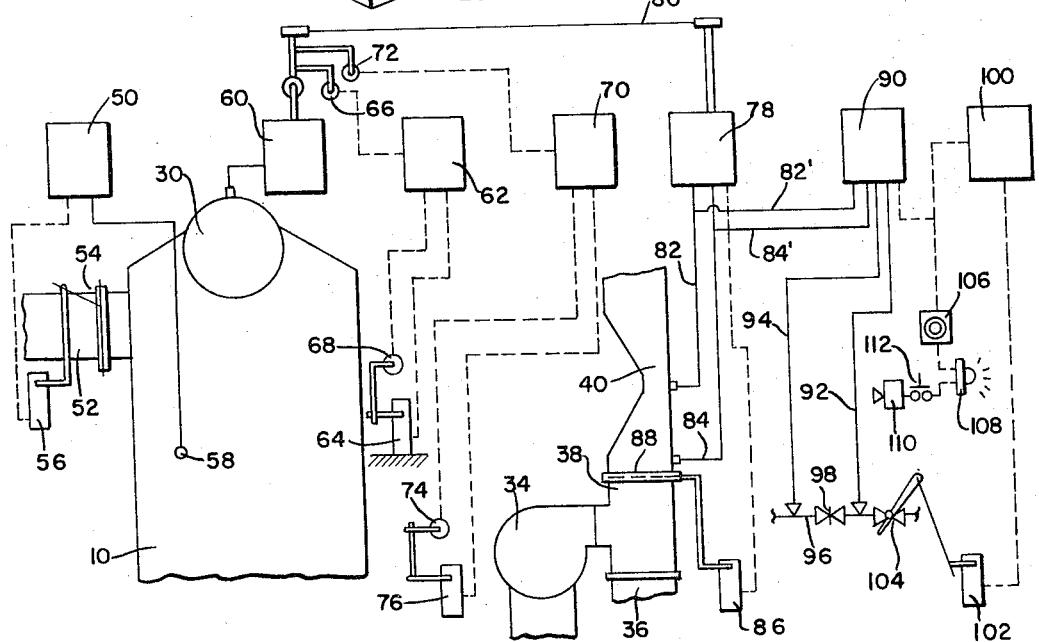
FIG. 4 is a schematic diagram of the control system of the present invention.

An important aspect of the present invention resides in the provision of a combination of suitable control means. The control scheme of the present invention is shown schematically in FIG. 4.

A furnace draft 58 is provided within the furnace 10 and is controlled by a furnace draft controller 50 which controls the furnace draft through the draft conduit 52 by adjusting the uptake damper valve 54 via an outlet damper operator 56. A typical master controller 60 is provided to measure the steam pressure in the main steam drum 30 and adjusts the fuel and combustion air accordingly to maintain constant pressure.

A primary fuel speed controller 62 is provided to control speed of feeding wet wood or other primary fuel into the furnace through the hoppers 24. The primary fuel speed controller 62 is positioned, i.e. controlled, by the master controller 60. The primary fuel feeder speed controller 62 acts upon a stoker feed operator 64 shown schematically in FIG. 4. A potentiometer transmitter 66 receives a signal from the master controller 60 and passes the signal through the primary fuel feeder speed controller 62 to a potentiometer receiver 68 at the stoker feed operator 64.

An undergrate forced draft controller 70 is porvided in parallel with the primary fuel feeder speed controller 62. The undergrate forced draft controller 70 controls the forced draft air to the position beneath the grate 26 via the first conduit 36. The undergrate forced draft controller 70 is positioned, i.e. controlled, by the master controller 60 which sends a signal via the potentiometer transmitter 72 through the undergrate forced draft controller 70 to a potentiometer receiver 74 which signals an undergrate air damper operator 76 controlling the opening in the first conduit 36.

An air flow controller 78 is provided to meter and control oxygen, preferably in the form of air, to the furnace via the second air conduit 38 and adjacent the secondary fuel burners. The air flow controller 78 is also controlled by the master controller 60 via the line 80. Air pressure lines 82 and 84 run from the air flow controller 78 to the Venturi section 40 of the second air conduit 38; the air flow controller 78 senses the amount of air flow through the Venturi via the pressure lines 82 and 84 and signals an air damper operator 86 which directly controls the rate of flow of combustion air into the second conduit 38 via a damper 88.

A ratio controller 90 is provided to meter the combustion air and secondary fuel and to correctly proportion the secondary fuel to the quantity of air available for its combustion. The ratio controller 90 is provided with air pressure lines 82' and 84' which pass to the pressure lines 82 and 84, respectively, and thereby sense the amount of combustion air flowing through the second conduit 38. In addition, fuel pressure lines 92 and 94 pass between a secondary fuel line 96, which provides secondary fuel to the nozzles 40, and the ratio controller 90. A line flow orifice 98 is provided in the secondary fuel line 96 between the two pressure lines 92 and 94.

A load limiter safety controller 100 is provided to prevent an increase of secondary fuel when the furnace draft is reduced to zero. The load limiter safety controller 100 also decreases secondary fuel flow when the furnace draft becomes positive. The load limiter safety controller 100 is controlled by the ratio controller 90 from which it receives a signal and passes it to a secondary fuel valve operator 102 which operates a secondary fuel control valve 104 in the secondary fuel line 96 thereby controlling the amount of secondary fuel to the nozzles 40.

Whenever the ratio controller 90 determines that the air supply controller 78 is unbalanced towards a combustion air deficiency for more than a preset number of seconds, an adjustable signal timer 106, which may be adjusted to any preset time period, energizes visual alarm 108 and an audible alarm 110. The alarm horn 110 and indicator light 108 thus signify whenever combustion air supply is inadequate to burn the available secondary fuel. A silencing button 112 is also provided to shut off the horn 110.

It is understood that the separate elements of the control scheme, i.e. all the separate controllers, are well known commercial devices. Their combination and association as provided in the present system is unknown.

It will be obvious to those skilled in the art that various changes may be made without departing from the scope of the invention and therefore the invention is not limited to what is shown in the drawings, and described in the specification, but only as indicated in the appended claims.

What is claimed is:

1. An apparatus for generating heat comprising a furnace, a feeding means for providing said furnace with wet primary fuel, means for introducing into said furnace a secondary fuel at a point where the wet primary fuel will pass through the flame of the secondary fuel, means for introducing oxygen into said furnace at a controlled rate, and means to control the feeding rate of said secondary fuel in relation to:
    (a) the quantity of primary fuel being introduced,
    (b) the amount of moisture which must be evaporated from said primary fuel to maintain its combustion,
    (c) the heat demand from the furnace, and
    (d) the available oxygen for said secondary fuel after primary fuel combustion demand.

2. A device in accordance with claim 1 wherein said means for introducing oxygen into said furnace passes combustion air into said furnace, further comprising a forced draft fan and conduit for said air introducing means, said conduit having a Venturi section therein.

3. A device in accordance with claim 2 further comprising a grate wherein said means for introducing secondary fuel is situated so that the flame of said secondary fuel radiates heat to said grate.

4. A device in accordance with claim 3 wherein said grate is provided at the bottom of said furnace, further comprising a boiler having a lower drum adjacent said grate, said means for introducing secondary fuel and said means for introducing air comprising facing openings in the opposing side walls of said furnace above said grate, said means for feeding wet primary fuel comprising distribution hoppers in the end wall of said furnace opposite from said boiler and above the horizontal level of said secondary fuel and air supplying openings.

5. A device in accordance with claim 4 for generating steam wherein said means to control the feeding rate of said secondary fuel comprises a master controller for sensing steam pressure to adjust fuel and combustion air to maintain constant pressure, a primary fuel feed controller for feeding primary fuel controlled by said master controller, an air flow controller to meter and control combustion air to said means for feeding secondary fuel, said air flow controller being controlled by said master controller, and a ratio controller to meter air and secondary fuel and to proportion the secondary fuel to the quantity of air available for combustion, said air flow controller and said ratio controller having lines to said conduit at said Venturi section.

6. An apparatus in accordance with claim 3, wherein said means to control the feeding rate of said secondary fuel comprises a master controller to adjust fuel and combustion air to provide a demand amount of heat from said furnace, a primary fuel feed controller for feeding primary fuel controlled by said master controller, an air flow controller to meter and control combustion air to said means for introducing secondary fuel, said air flow controller being controlled by said master controller, and a ratio controller to meter air and secondary fuel and to proportion the secondary fuel to the quantity of air available for combustion, said air flow controller and said ratio controller having lines to said conduit at said Venturi section.

References Cited by the Examiner

UNITED STATES PATENTS

| 2,294,242 | 8/1942 | Rohrer | 100—7 |
| 2,860,611 | 11/1958 | Allen | 122—240 |
| 2,925,055 | 2/1960 | Miller et al. | 110—7 X |

KENNETH W. SPRAGUE, *Primary Examiner.*